(12) United States Patent
Sadler

(10) Patent No.: US 7,701,163 B2
(45) Date of Patent: Apr. 20, 2010

(54) STEPPING MOTOR CONTROL METHOD

(75) Inventor: Gordon Harry Eric Sadler, Wokingham (GB)

(73) Assignee: Minebea Co. Ltd, Nagano (JP)

( * ) Notice: Subject to any disclaimer, the term of this patent is extended or adjusted under 35 U.S.C. 154(b) by 972 days.

(21) Appl. No.: 11/387,187

(22) Filed: Mar. 22, 2006

(65) Prior Publication Data
US 2007/0075594 A1 Apr. 5, 2007

(30) Foreign Application Priority Data
Mar. 29, 2005 (GB) .................................. 0508892.7

(51) Int. Cl.
*H02P 8/00* (2006.01)
(52) U.S. Cl. ........................................ 318/696; 318/685
(58) Field of Classification Search .................. 318/696, 318/685

See application file for complete search history.

(56) References Cited

U.S. PATENT DOCUMENTS

| 3,986,094 | A | * | 10/1976 | Quioque et al. .............. 318/696 |
| 5,783,939 | A | * | 7/1998 | Lippmann et al. ........ 324/154 R |
| 5,847,531 | A | * | 12/1998 | Hoffsommer et al. ........ 318/696 |

* cited by examiner

*Primary Examiner*—Bentsu Ro
*Assistant Examiner*—Erick Glass
(74) *Attorney, Agent, or Firm*—Thomas E. Loop; Graybeal Jackson LLP

(57) ABSTRACT

A stepping motor control method, comprising the step of magnetising at least one of a number of teeth within the stepping motor to move a rotor of the stepping motor into a position such that it contacts or maintains contact with a mechanical stop, wherein a first tooth is generally aligned with the mechanical stop and at least one of the teeth is magnetised such that a rotational force acts to urge the rotor in only a direction towards the mechanical stop, thereby resetting the position of the rotor.

17 Claims, 6 Drawing Sheets

| BOX WIRE PIN | M 1 | B 2 | MK 3 | BK 4 | B1 | A1 | B2 | A2 | PHASE ON CONDITIONS |
|---|---|---|---|---|---|---|---|---|---|
| 1 ZERO REF | − | | + | | ⊔ f=0 | N/S ▷ | ⊔ | S/N | A |
| 2 | − | − | + | + | N ← ▷ | N/S | S | S/N | A+B |
| 3 | | − | | + | N ← ▷ | S | S | N | B |
| 4 | + | − | − | + | N ← ▷ | S | S | N | B+$\overline{A}$ |
| 5 | + | | − | | ⊔ ? | S ▷ | ⊔ | N | $\overline{A}$ |
| 6 | + | + | − | − | S ▷ | S | N → | N | $\overline{A}$+$\overline{B}$ |
| 7 | | + | | − | S ▷ | ⊔ | N → | ⊔ N | $\overline{B}$ |
| 8 | − | + | + | − | S ▷ | N/S | N | S | A+$\overline{B}$ |

FIG. 4

| BOX WIRE PIN | M 1 | B 2 | MK 3 | BK 4 | CONDITIONS AT ZERO RESET | | | | PHASE ON CONDITIONS |
|---|---|---|---|---|---|---|---|---|---|
| | | | | | B1 | A1 | B2 | A2 | |
| 1 ZERO REF | − | | ⊕ | | $f=0$ | N/S | | S/N | A |
| 2 | − | − | ⊕ | ⊕ | N/$f$ ← | N/S | S | S/N | A+B |
| 3 | | − | | ⊕ | N/$f$ ← | S | S | N | B |

FIG. 5

STEPPING MOTOR CONTROL METHOD

THE PRESENT INVENTION relates to a method of controlling a stepping motor and, in particular, concerns a method of resetting a stepping motor.

Stepping motors are used in a number of instrumentation applications including, for example, speedometers and tachometers in automobile dashboard displays. For such applications a needle is secured to a rotor of the stepping motor such that it extends in a direction generally perpendicular to a longitudinal axis of the rotor. The needle points to an appropriate value or position on a dial as determined by the stepping motor. The operation of stepping motors is ideally suited for instrumentation applications as the needle can be driven in discreet and specific steps to point to an appropriate value or position on the dial.

The construction of a stepping motor used for instrumentation applications is well known by those skilled in the art. A stepping motor of this type comprises a rotor which has a number of magnetised portions around its outer surface. A stator of the motor has a number of toroidal windings around teeth which are radially disposed around the stator. By passing a current through one of the windings, a set of the teeth will act as an electromagnets and, depending on the direction of the current passing through the winding, will form either a north or south magnetic pole.

The sequence of excitation of the windings of the stator may, therefore, be used to attract or repel the magnetised portions of the rotor. By specifically controlling the sequence of excitation of the windings (for example in micro step mode where the rotor may move by as little as $\frac{1}{64}^{th}$ of one full step of the motor) it is further possible to cause the rotor to rotate a predetermined amount under the magnetic force of the current carrying windings. At any given time, if the stepping motor control system knows the initial position of the rotor, then it will be able to move the rotor to another known position and therefore direct a needle attached to the rotor to point to a specific value or position on the dial.

The control of a stepping motor in automotive instrumentation is usually achieved by the use of a digital processor and associated memory elements. The processor can apply control signals to driving circuitry to excite the various windings of the motor stator.

In general feedback from the rotor regarding its rotational position is not provided as it involves small and overly expensive equipment. Therefore problems with the control of the stepping motor occur when the initial position of the rotor is unknown. The position of the needle at any given time is normally stored in the memory element which is often RAM. However, RAM requires a power source in order for the data stored in the device to be retained. Hence, if the power to the RAM is removed the stepping motor controller will not have an accurate record of the rotational position of the rotor.

Instances when power to the RAM may be disrupted are reasonably foreseeable and relatively common. For example, in an automotive application, the battery of a vehicle may become disconnected. Upon restarting the stepping motor control circuitry the controller will not have a record of the precise rotational position of the rotor (or the location of the needle on the dial) and consequently any future movements of the rotor may not place the rotor (and hence the needle) in the desired rotational position. If such an error were to occur in the example of a vehicle speedometer then the vehicle may conceivably become illegal to operate.

Additional situations are also envisaged in which the position of the rotor may be or become unknown. For example, following a large mechanical impact.

In order to overcome the error described above, it is necessary to reset the stepping motor in such a way that the position of the rotor following the resetting process is known. As a measure to maintain accurate readings on instrumentation devices using a stepping motor, resetting of the stepping motor is also carried out when a key for a vehicle is inserted or removed from the ignition of that vehicle.

Each stepping motor normally has at least one mechanical stop to ensure that the rotor does not move any needle which may be attached to it beyond the edge of the scale of the dial with which it is associated. It is this mechanical stop that is utilised in the process (described below) of resetting the stepping motor.

In a conventional resetting process the rotor (and needle) may be initially driven in a counter clockwise direction for one cycle (which is equal to one full rotation of the rotor within its operating range and an additional amount to accommodate any errors) using a standard control sequence. This will move the rotor of the stepping motor into a position where its further rotation is prevented by the mechanical stop. Since the position of the mechanical stop is known, the position of the rotor (and needle) will also be known at this point. As an added measure to ensure the position of the rotor has been accurately determined some conventional schemes may drive the rotor in one direction for one complete cycle and then drive the rotor back in the appropriate direction for one cycle. This will move the rotor (and needle) onto a second mechanical stop and then back to the first mechanical stop corresponding to the zero position on the dial.

Conventional resetting schemes such as those described above work reasonably well in most applications but have a number of problems associated with them. For example, if the rotor is less than one complete cycle from the mechanical stop when resetting is initiated, for a proportion of the resetting cycle the rotor is forced against the mechanical stop under the action of the standard control sequence. Under the standard control sequence during a first two stages after the rotor has reached the mechanical stop the rotor will be forced towards the mechanical stop. During a third stage the rotor may step away from the stop by as much as two complete steps. A fourth step will move the rotor away from (or towards) the mechanical stop by one complete step. The sequence of stages are repeated and the rotor will oscillate between the mechanical stop and a position one step way from the mechanical stop. Noise caused by this oscillation is often seen as unacceptable to automotive manufacturers and hence some conventional resetting schemes may alter the standard control sequence to only utilise one of two toroidal windings provided. This removes the issues in relation to the fourth stage of the standard control sequence. However, the rotor may still move in a direction away from the mechanical stop in a similar way to the third stage of the standard control sequence. To ensure that this does not occur considerable effort must be made during the quality control stages of the manufacture of stepping motors to ensure mechanical stops are aligned with appropriate stator teeth. The stator and rotor mechanical stops, magnetic poles of the rotor, and the stator magnetic poles must be aligned such that the sum of these various angles does not lead to an error of more than +0.25° to −1.25°. (In this sense '−' means in the direction of the valid range of motion of the rotor, and '+' means beyond the valid range of motion of the rotor).

The problems of vibration are amplified when a number of the stepping motors are attached to a single dashboard and all the motors are reset contemporaneously. The vibration problem is further compounded when the needles attached to the stepping motors vibrate against any visible or hidden mechanical rest or stop on the dashboard itself. The noise created by all the vibrations may cause a common circuit board to which the motors are mounted to resonate which increases the noise level still further.

An additional problem occurs when the power is subsequently removed from the stepping motor (but not necessarily the RAM). When the power to the stepping motor is removed the rotor will attempt to align itself with the stator tooth having the most residual flux. This residual flux may force the rotor in a direction towards the mechanical stop or may force the rotor in a direction away from the mechanical stop. In certain applications movement of this sort away from the mechanical stop is seen as unacceptable and hence provides a further reason why the standard control sequence is inadequate.

When friction within the motor is increased (for example when the motor is at low temperatures such as −40° C.) then the conventional resetting sequences may not perform sufficiently well enough to determine the rotational position of the rotor after the conventional reset sequence has been completed. As has already been noted, the conventional reset sequence can result in an oscillation of the rotor and the single winding method described above which can be used to overcome this issue cannot move the rotor if it stalls during the reset sequence as after the initial acceleration there is insufficient (possibly zero) torque to restart the motor.

It is an object of the present invention to seek to ameliorate the problems described above.

Accordingly, one aspect of the present invention provides a method of controlling a stepping motor comprising the step of: magnetising at least one of a number of teeth within the stepping motor to move a rotor of the stepping motor into a position such that it contacts or maintains contact with a mechanical stop, wherein a first tooth is generally aligned with the mechanical stop and at least one of the teeth is magnetised such that a rotational force acts to urge the rotor in only a direction towards the mechanical stop, thereby resetting the position of the rotor.

Preferably, the mechanical stop is at a known position.

Conveniently, the method further comprises a start-up step in which a number of the teeth are magnetised to provide the rotor of the motor with momentum.

Advantageously, the method further comprising the step of providing n teeth in the stepping motor, wherein n is an even number and the n teeth are arranged in two sets such that a first tooth of a first set is offset by an angle from a first tooth of a second set.

Preferably, the magnetised teeth of the first set have alternating polarities, and teeth of the second set have alternating polarities.

Conveniently, the stepping motor is controlled in half-step mode and the method further comprises a start-up step in which a number of the windings are excited to provide the rotor of the motor with momentum.

Advantageously, the start-up step comprises the following steps carried out in sequential order: magnetising the first tooth of the first set of teeth, the first tooth being generally aligned with the mechanical stop, to form the first pole and magnetising a second tooth of the first set of teeth to form the second pole; magnetising a first tooth of the second set of teeth, positioned to one side of the first tooth of the first set of teeth, to form a third pole of the same polarity of as the first pole and magnetising a second tooth of the second set of teeth, positioned between the first and second teeth of the first set of teeth and on the opposing side of the first tooth of the first set of teeth to that of the first tooth of the second set of teeth, to form the fourth pole; ceasing to magnetise the first and second teeth of the first set of teeth; magnetising the first tooth of the first set of teeth to form the first pole with a polarity opposite to that of the third pole and magnetising the second tooth of the first set of teeth to form the second pole; ceasing to magnetise the first and second teeth of the second set of teeth; and magnetising the first tooth of the second set to form the third pole with polarity opposite to that of the second pole and magnetising the second tooth of the second set to form the fourth pole.

Preferably, the start-up step further comprises the following sequential steps: ceasing to magnetise the first and second teeth of the first set of teeth; and magnetising the first tooth of the first set of teeth to form the first pole with polarity opposite to that of the third pole and magnetising the second tooth of the first set of teeth to form the second pole.

Conveniently, the resetting step comprises the following sequential steps: magnetising the first tooth of the first set of teeth to form the first pole and magnetising a second tooth of the first set of teeth to form a second pole; magnetising the first tooth of the second set of teeth, positioned to one side of the first tooth of the first set of teeth, to form the third pole with a polarity opposite to that of the second pole and magnetising a second tooth of the second set of teeth, positioned between the first and second teeth of the first set of teeth and on the opposing side of the first tooth of the first set of teeth to that of the first tooth of the second set of teeth, to form the fourth pole; and ceasing to magnetise the first and second teeth of the first set of teeth.

Advantageously, the first sequential step is repeated a number of times.

Conveniently, the first sequential step is repeated twice.

Advantageously, the stepping motor is controlled in full step mode.

Preferably, the stepping motor is controlled in micro-step mode.

Conveniently, the motor is controlled in half step mode.

Advantageously, there are two or more poles on a rotor of the stepping motor.

Preferably, the teeth of the stator are magnetised by using current carrying coils or windings in the motor.

Conveniently, the stepping motor is attached to one or more gears.

Advantageously, if a first tooth of a first set of teeth is magnetised all of a first sub-set of the first set of teeth are magnetised in a corresponding manner to the first tooth of the first set of teeth, if a second tooth of a first set of teeth is magnetised all of a second sub-set of the first set of teeth are magnetised in a corresponding manner to the second tooth of the first set of teeth, if a first tooth of a second set of teeth is magnetised all of a first sub-set of the second set of teeth are magnetised in a corresponding manner to the first tooth of the second set of teeth, and if a second tooth of a second set of teeth is magnetised all of a second sub-set of the second set of teeth are magnetised in a corresponding manner to the second tooth of the second set of teeth.

Another aspect of the present invention provides a stepping motor operable to have at least one of a number of teeth within the stepping motor magnetised to move a rotor of the stepping motor into a position such that it contacts or maintains contact with a mechanical stop, wherein a first tooth is generally aligned with the mechanical stop and at least one of the teeth is magnetised such that a rotational force acts to urge the rotor in only a direction towards the mechanical stop, thereby resetting the position of the rotor.

Another aspect of the present invention provides a control circuit operable to provide control signals to a stepping motor to magnetise at least one of a number of teeth within the stepping motor to move a rotor of the stepping motor into a position such that it contacts or maintains contact with a mechanical stop, wherein a first tooth is generally aligned with the mechanical stop and at least one of the teeth is magnetised such that a rotational force acts to urge the rotor in only a direction towards the mechanical stop, thereby resetting the position of the rotor.

Preferably, another aspect of the present invention provides an instrumentation panel with at least one motor attached thereto.

Conveniently, another aspect of the present invention provides an instrumentation panel having one or more control circuits associated therewith.

It will be appreciated that references to the mechanical stop refer to the mechanical stop of the stator which interacts with the mechanical stop of the rotor.

In order that the present invention may be more readily understood, embodiments thereof will be described, by way of example, with reference to the accompanying drawings, in which:

FIG. 4 shows a start-up sequence for use in a method embodying the present invention in half step mode.

FIG. 5 shows a reset sequence for use in a method embodying the present invention in half step mode.

Figure 1:
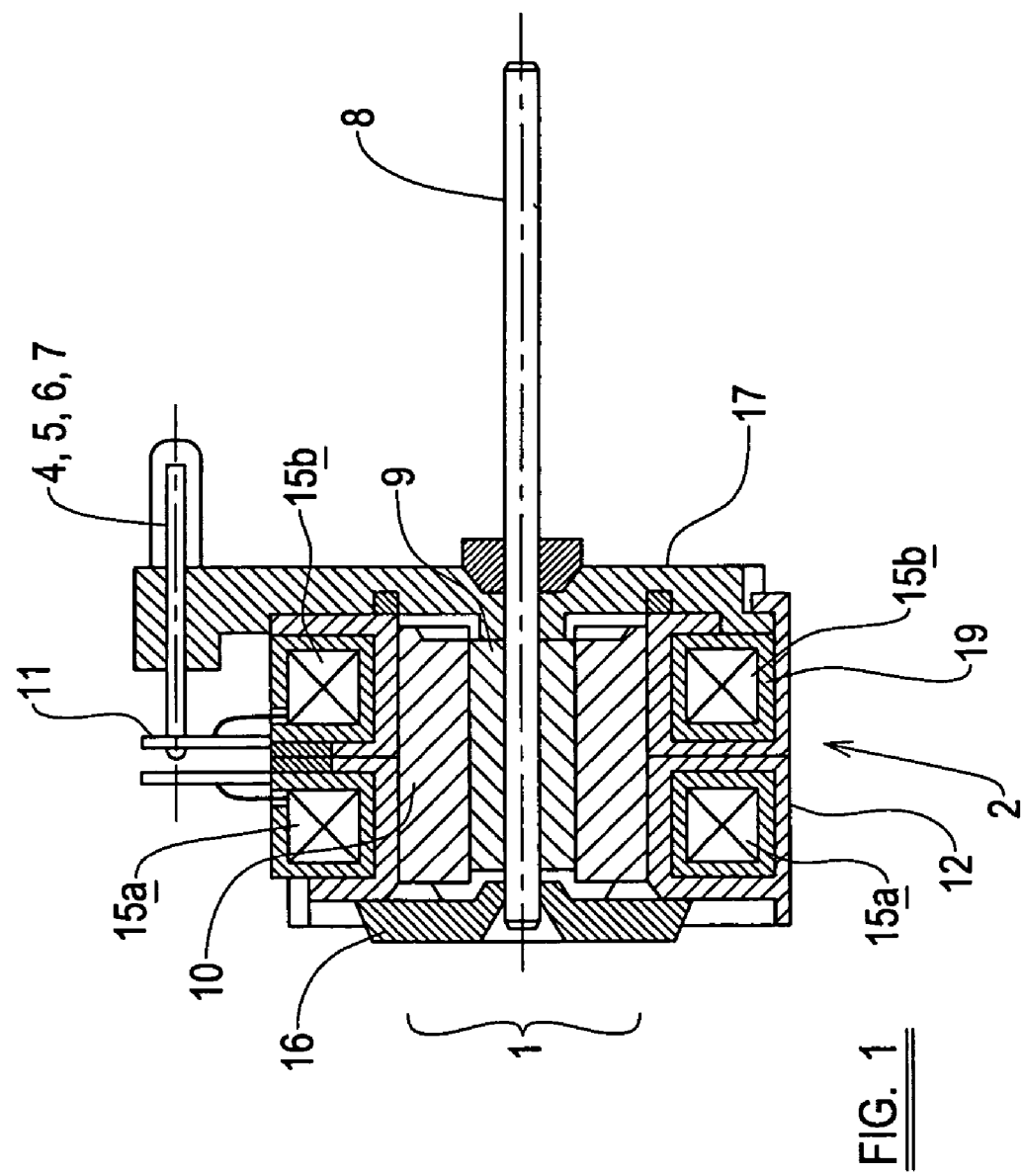
FIG. 1 is a cross-sectional side view through a stepping motor for use with a method embodying the present invention.
Figure 2:
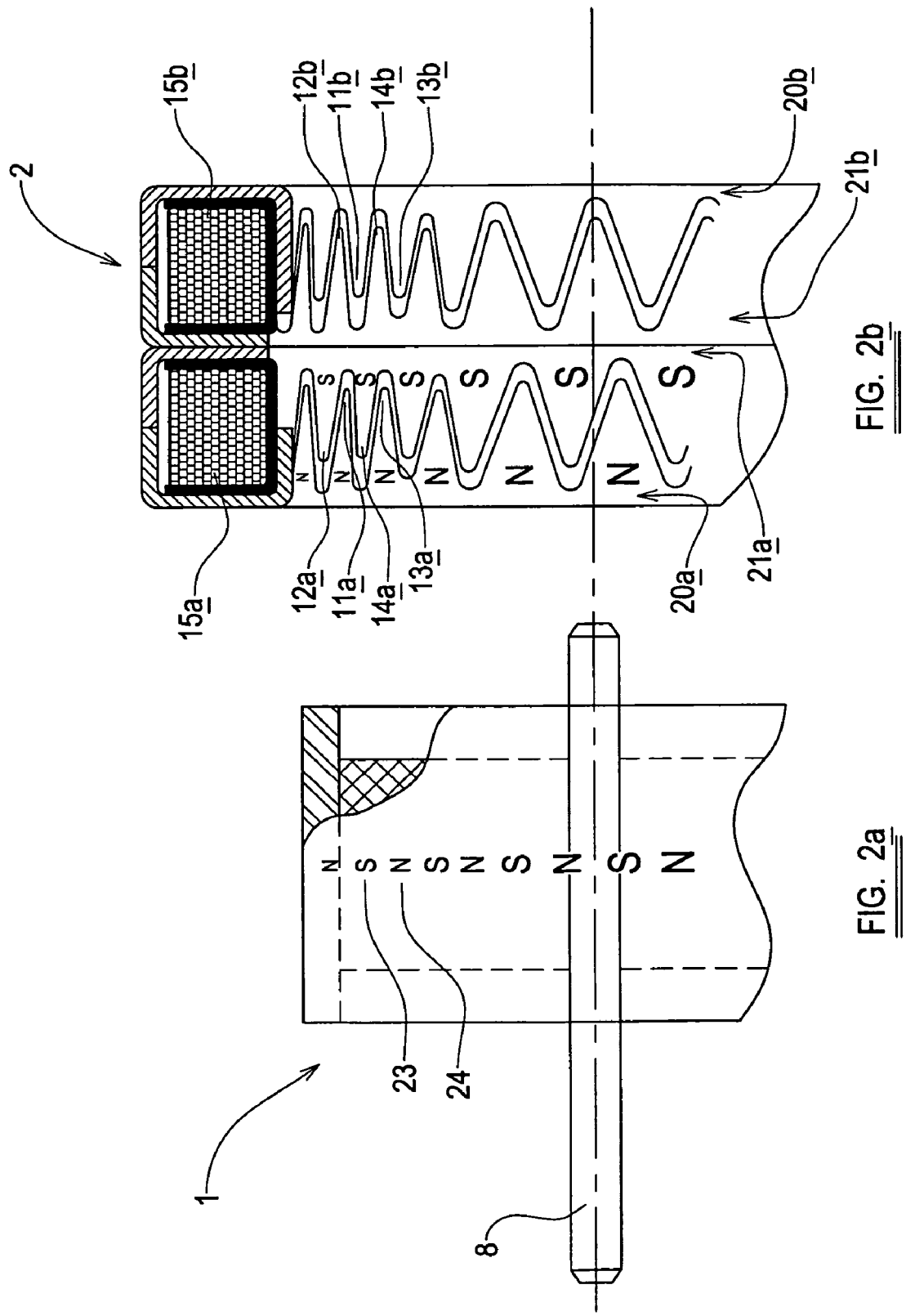
FIGS. 2a and 2b show an enlarged view of a stepping motor rotor and stator respectively.

The present invention relates to a method of controlling a stepping motor. Many different forms of stepping motor are known and one example of a stepping motor is shown in FIGS. 1 and 2.

The stepping motor has a rotor 1, a stator 2, case elements, connection pins 4,5,6,7 and a shaft 8. The rotor 1 consists of a generally cylindrical shaft sleeve 9 through which the shaft 8 may pass. The shaft sleeve 9 and shaft 8 are secured tightly together so that there is generally no rotational movement of the shaft sleeve 9 relative to the shaft 8. The shaft 8 has a length of approximately 30 mm (in this case) and the shaft sleeve 9 has a length which is an order of magnitude less than the length of the shaft 8. In this case, the shaft sleeve 9 has a length of approximately 12.5 mm. The shaft sleeve 9 is secured to the shaft 8 so that a first end of the shaft 8 extends beyond a first end surface of the shaft sleeve 9 and a second end of the shaft 8 extends beyond a second end of surface of the shaft sleeve 9 by a distance (approximately 17.1 mm in this case) greater than the first end of the shaft 8.

The rotor 1 further comprises a tubular magnetic core 10 which is generally equal in length to the shaft sleeve 9. An internal circumferential diameter of the magnetic core 10 is approximately equal to an external diameter of the shaft sleeve 9, such that an internal surface of the magnetic core 10 is secured to a corresponding external surface of the shaft sleeve 9. In this arrangement the entire external surface of the shaft sleeve 9 is covered by the internal surface of the magnetic core 10, and there is generally no relative movement between the magnetic core 10 and shaft sleeve 9.

The magnetic core 10 is radially magnetised such that an outer surface of the magnetic core 10 presents, around the circumference thereof, alternating north and south magnetic poles.

The stator 2 comprises a cylindrical composite tube comprising four interlocking combs, the tube having a length generally equal to the length of the magnetic core 10. An 'A' phase set of teeth comprise a first set teeth (of which only two are provided with reference numerals) 11a,13a which extend from a first comb 20a towards a second set of teeth (of which only two are provided with reference numerals) 12a,14a which extend from a second comb 21a. The first 11a,13a and second 12a,14a sets of teeth interlock with a small separation between a tooth 11a,13a of the first comb 20a and an adjacent tooth 12a,14a of the second comb 21a. All the teeth 11,12,13,14 extend in a plane which is parallel to an internal circumferential surface of the stator 2 and have approximately equal lengths. The first 20a and second 21a combs together occupy a total length which is generally less then half the length of the stator 2 and the two combs 20a,21a are located towards a first end of the stator 2. It will be understood that this arrangement of teeth continues around the entire internal circumferential surface of the stator 2. The teeth of the first comb 20a interlock with the corresponding teeth of the second comb 21a.

The stator further comprises a 'B' phase set of teeth 11b,12b,13b,14b which have a similar arrangement to the 'A' phase set of teeth (reference numerals have been issued to the various parts of the 'B' phase set of teeth which correspond to the various parts of the 'A' phase set of teeth). However, the 'B' phase set of teeth 11b,12b,13b,14b are offset from the 'A' phase set of teeth 11a,12a,13a,14a such that there is an angle between a tooth of the 'A' phase set of teeth and the corresponding tooth of the 'B' phase set of teeth. This angle represents one full step of the motor. The 'B' phase set of teeth 11b,12b,13b,14b are located towards a second end of the stator 2.

All the teeth of the 'A' phase set of teeth have a continuous wire winding 15a around an outer surface of the teeth. The winding 15a is such that the teeth extending from the first comb 20a will have a first polarity and the teeth extending from the second comb 21a will have a second polarity which is opposite to the first polarity. An external surface of the wire winding 15a is covered in a thin plastic insulator to prevent unintentional flow of electrical current. Similarly all the teeth of the 'B' phase set of teeth have a continuous wire winding 15b around their outer surface. It will be understood that there are four winding ends which are connected to the connection pins 4,5,6,7, of which there are four.

The motor case elements comprise two end caps 16,17 which are secured to either end of the stator 2 after the rotor 1 has been placed within the stator 2. Each end cap 16,17 is disc shaped and has a hole through its width in the centre of the disc. The hole is such that it corresponds to a diameter of the shaft 8. The first and second ends of the shaft 8 may, therefore, pass through the holes in the end caps 16,17 and be held therein. The shaft 8 may, however, rotate within the holes of the end caps 16,17.

A first end cap 16, through which the first end of the shaft 8 passes, has a diameter less than that of the stator 2. Therefore, a portion of an end circumferential surface of the stator 2 is exposed. The stator is held in fixed relation to the dashboard PCB.

A second end cap 17, through which the second end of the shaft 8 passes, has a diameter greater than that of the stator. An extension of the second end cap is operable to receive and hold in place the connection pins 4,5,6,7.

It is envisaged that shaft may be further connected to one or more gears (not shown). The one or more gears may also be connected to one or more additional shafts (not shown) and a needle (not shown) may be secured to any of the shafts mentioned above.

Suitable materials for each of the components of the stepping motor are well known in the art and will not be described.

Figure 3:
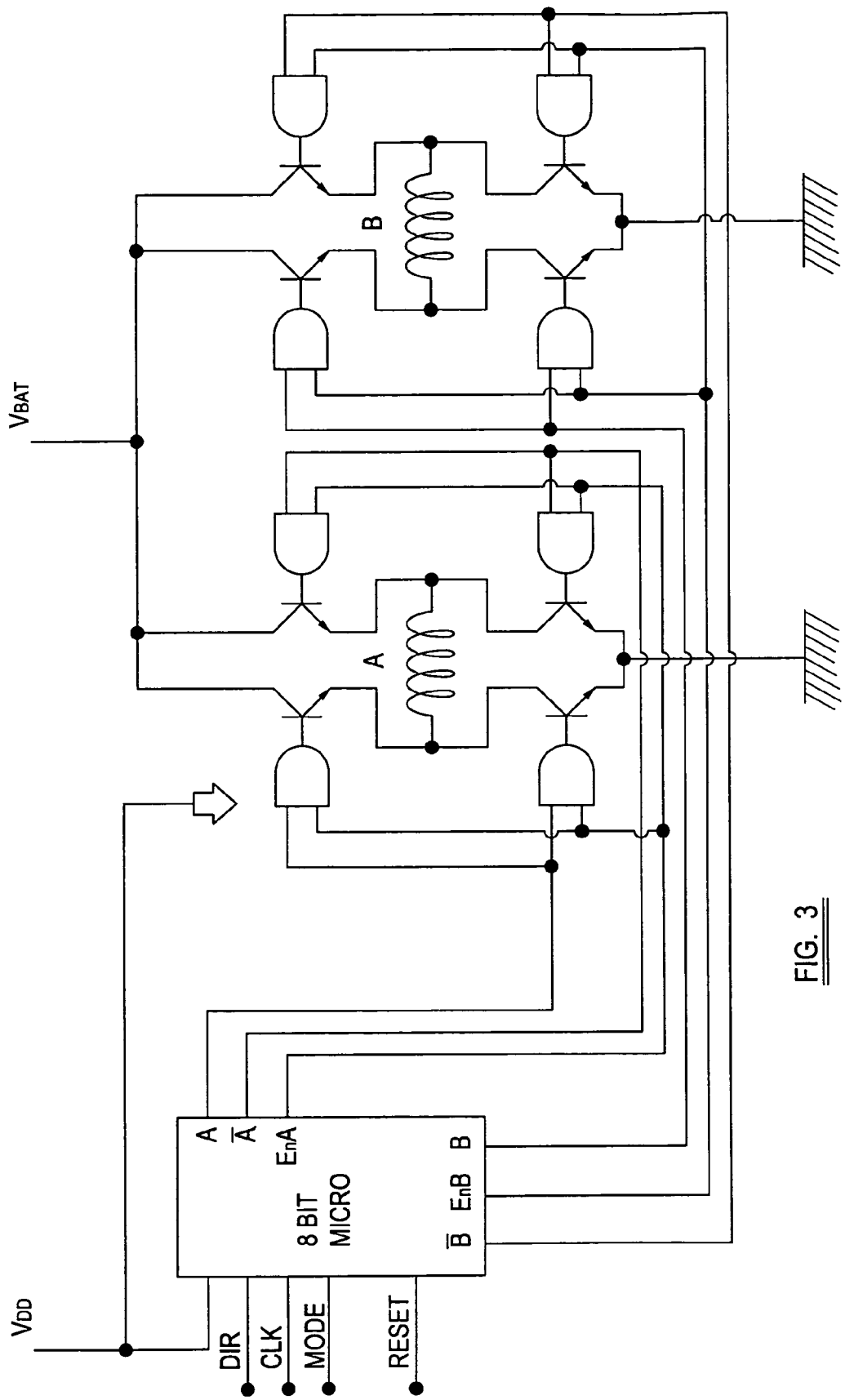
FIG. 3 shows control and drive circuitry for use with a method embodying the present invention.

FIG. 3 shows a typical arrangement of electronic components which is well known in the art and is operable to carry out the control scheme embodying the present invention.

Only the two windings (A, B) are shown in this diagram, for the sake of simplicity. However it is envisaged that there may be any number of windings and an equal number of phase sets of teeth.

It will be understood that a current passed through the two windings (A, B) will have different effects on the teeth of the stator, as has been described above. There will therefore be two paired sets of poles (A1,A2) and (B1,B2) formed in the respective phase sets of teeth when a current is passed through the windings around the (A) or (B) phase sets of teeth. The polarity of the poles formed in teeth of the first comb in each phase set (A1) or (B1) will be opposite to that formed in the teeth of the second comb of each phase set (A2) or (B2). The positioning of these windings within the motor is discussed above.

The arrangement of transistors around each winding will be familiar to those skilled in the art and is commonly known as an 'H-bridge'. Each winding in the present control mechanism is associated with its own H-bridge and each H-bridge consists of four NPN transistors. A first end of each winding (A, B) is associated with a first and second NPN transistor. In particular, the first end of each winding is connected to the emitter of a first transistor and the collector of the second transistor. Similarly, a second end of each winding (A,B) is connected to a third and fourth transistor. In particular, the second end of each winding is connected to the emitter of a third transistor and the collector of the fourth transistor. The base connection of each transistor is connected to the output of an AND gate, such there is one AND gate for every transistor in the circuit. The collector connections of the first and third transistors are connected to a voltage source ($V_{BAT}$) and the emitter connection of the second and fourth transistors are grounded.

One input of the AND gate which is connected to the first transistor is also connected to an output of an 8-bit microprocessor. This output from the 8-bit microprocessor will be labelled (A) or (B) for convenience. One input to the AND gate connected to the second transistor is connected through a NOT gate to output (A), or (B) respectively, from the 8-bit microprocessor. Similarly, one input to the AND gate connected to the third transistor is connected to another output from the 8-bit microprocessor. This output from the 8-bit microprocessor will be labelled ($\overline{A}$) or ($\overline{B}$) for convenience. An input to the AND gate connected to the fourth transistor is connected through a NOT gate to the ($\overline{A}$), or ($\overline{B}$) respectively, output of the 8-bit microprocessor. Another input, which is common to all the AND gates connected to the four transistors, is a connection to a third output from the 8-bit microprocessor. This output shall be labelled label (EnA) or (EnB) for convenience.

It will be appreciated that any number of coils may be controlled by utilising a similar control circuit. However, as every coil added to the system requires 3-outputs from the micro-controller, it may be necessary to either have a number of 8-bit micro-controllers running in parallel or use, for example, a 16-bit micro-controller.

Other connections to the micro-controller include clock (CLK), mode (MODE), reset (RESET), power supply ($V_{DD}$), and direction (DIR) inputs.

It will be appreciated that the AND gates require power ($V_{DD}$) in order to operate, as will the micro-controller.

Utilising the circuit described above it is therefore possible to excite the coils with a current in either direction through the coils and thereby control the stepping motor.

For the purpose of simplifying the description of control scheme embodying the present invention, the stepping motor will be considered only in terms of two magnetic poles 23,24 of the rotor and only in terms of two teeth in each phase set of teeth (A) 11a,12a and (B) 11b,12b. It will be understood that when a current is passed through the windings the four teeth (two belonging to each phase set) will comprise a first pole (A1) at a first tooth 11a, a second pole (A2) at a second tooth 12a (complementary to the first pole), a third pole (B1) at the third tooth 11b, and a fourth pole (B2) at a fourth tooth 12b (complementary to the third pole) which will be labelled by reference to the respective pole for the purposes of the description of the control scheme.

Despite the description of the control scheme only mentioning a limited number of rotor and stator poles, It is envisaged that the present control scheme will function with any combination of rotor poles and stator winding numbers.

The stepping motor control method embodying the present invention comprises two sequences of output commands from the micro-controller which correspond to the micro-controller outputs described above. The steps, in half step mode, of these two sequences are shown in FIGS. 4 and 5 which also pictorially depict the forces, alignments of poles which may occur with the rotor at the mechanical stop, and the phase on conditions corresponding to the outputs of the micro-controller. It will be appreciated that the rotor and stator are depicted in a linear arrangement and that the (B) polar position could be reasonably considered to be 'beyond' the mechanical stop. In this linear depiction the direction of forces will be described as 'towards' and 'away from' the stop, although it will be appreciated that the rotor does in fact have a circular cross-section.

The first sequence is a "start-up" sequence which is used to provide the rotor with some momentum so that when the second sequence is output, the rotor will rotate accordingly. The "start-up" sequence is shown in FIG. 4, and comprises six steps.

It is assumed that the worst case scenario for rotor vibration has occurred and the rotor is already prevented from rotating any further by the mechanical stop. The pole of the rotor which is aligned with the mechanical stop in this position is a south pole 23 (although the operation of this invention will be understood to also function if all the polarities in this example are reversed). The nearest tooth 11a to the mechanical stop is generally aligned with the south pole 23 of the rotor 1 in this position.

In step one the (A) winding is excited to create a north magnetic (A1) pole. This north pole in the stator 2 will attract the south pole 23 of the rotor 1 and the rotor 1 shall not move. As the configuration of the rotor 1 and stator 2 described above explains, this will mean that the (A2) pole will be a south pole and is aligned with a north magnetic pole 24 of the rotor 1 and these two poles will also attract each other. Hence there will be no resultant torque.

In step two the (A) winding remains excited in the same way as the previous step, and the (B) winding is excited such that the (B1) pole is a north pole and the (B2) pole is a south pole. The south pole 23 of the rotor 1 is therefore attracted to the (B1) pole and the north pole 24 of the rotor 1 will be attracted to the (B2) pole. This will result in a rotational force acting on the rotor 1 in the direction of the mechanical stop.

In step three the (A) winding excitation is stopped, and the (B) winding excitation remains the same. The rotational force described in step two, therefore, still exists in the direction of the mechanical stop. If the rotor 1 were not already prevented from rotating by the stop then it will be appreciated that the rotational forces acting on the rotor 1 would drive the rotor 1 in the same rotational direction as that force (ie. towards the mechanical stop).

In step four the (A) winding is re-excited but in this step the (A1) pole is a south pole and the (A2) pole is a north pole. The excitation of the (B) winding remains the same as the previous step. Since the south pole 23 of the rotor 1 is still attracted to the (B1) pole and repelled from the (B2) pole (and the north pole 24 of the rotor 1 is attracted to the (B2) pole and repelled from the (B1) pole), the force acting on the rotor 1 is still in the direction of the mechanical stop.

In step five, the (B) winding is not excited and the (A) winding remains in its excited state from the previous step. In this position, if the south pole 23 of the rotor 1 is aligned with the south pole of the (A1) pole (and the north pole 24 of the rotor 1 aligned with the (A2) pole), then the respective pole 23, 24 of the rotor 1 will be repelled from the stator poles with which they are aligned. Since the poles 23, 24 of the rotor 1 are aligned with the stator poles there is no resultant rotational force on the rotor 1. However, in practice the alignment of the stator pole may not be such that the stator pole is inline with the mechanical stop. Therefore, some rotational movement may occur in either direction depending on the offset of the mechanical stop from the stator tooth which forms the nearest pole.

In the sixth step, the (A) winding remains in the same excitation state as step five. The (B) winding is however excited to form a south (B1) pole and a north (B2) pole. The south pole 23 of the rotor 1 is, therefore, attracted to the north (B2) and (A2) poles, and repelled from the south (B1) and (A1) poles. Conversely, the north pole 24 of the rotor 1 is repelled by the north (B2) and (A2) poles. This will result in a corresponding rotational force on the rotor 1, moving in a direction away from the mechanical stop.

It will be understood that the rotor 1 of the stepping motor, if not already on the mechanical stop, will now have some initial momentum which will aid in the operation of the first steps of the resetting sequence. However, in an embodiment of the present invention a further two steps (the seventh, and eighth) may be carried out.

In the seventh step, the (A) winding is no longer excited and the (B) winding is excited in the same manner as the previous step. The force is therefore still in the same direction as step six and the rotor 1 will rotate in this direction.

In the eighth step, the (B) winding remains in the same state of excitation and the (A) winding is excited so as to form a north (A1) pole and a south (A2) pole. The south pole 23 of the rotor 1 will therefore cause the rotor 1 to move to a position so that the south pole 23 is between the (A1) and (B2) north poles.

It will be appreciated that now the poles 23, 24 of the rotor 1 are between the teeth of the stator, the excitation of any of the windings will cause the rotor 1 to rotate.

Following the "start-up" sequence, which is carried out once, the reset sequence depicted in FIG. 4 is carried out a number of times to ensure that the rotor 1 carries out one full rotation. For example, each completed reset sequence may move the rotor 1 by 10° and hence to complete a 360° full meter cycle, a total of 36 reset sequence completions would be necessary.

The reset sequence comprises three steps. In the explanation of the reset sequence the worst case scenario of the rotor 1 already being prevented from rotating by the mechanical stop will be assumed.

In the first step of the reset sequence, the (A) winding is excited to form a north (A1) pole and a south (A2) pole. Since it is assumed that the south pole 23 of the rotor 1 is aligned with the nearest stator pole (in this case (A1)), there is no resultant rotational force acting on the rotor 1 in this step. This step could be termed as a reference or zero step and may be repeated a number of times. Ideally this step is repeated twice.

In the second step of the reset sequence the (A) winding has the same excitation state as the previous step. However, (B) winding is excited to form a north (B1) pole and a south (B2) pole. The south pole 23 of the rotor 1 is, therefore, attracted to the (B1) pole and the north pole 24 of the rotor 1 to the (B2) pole. This results in a rotational force acting on the rotor 1 in the direction of the mechanical stop. If the position of the rotor 1 were different then it will be appreciated that this will cause the rotor 1 to rotate.

In the third step of the reset sequence, the (B) winding remains in the excitation state of the previous step. The excitation of the (A) winding, however, ceases. The rotational force acting on the rotor 1 is still present in the same direction as the previous step (towards the mechanical stop).

As described previously, the reset sequence is repeated a number of times until a complete cycle of rotor movement is been achieved.

It will be appreciated that when in addition to the control signals shown in FIGS. 4 and 5, if the (A) winding is to be excited the EnA line must also be driven high (and conversely if the (B) winding is to be excited the EnB line must be driven high).

At no point in the reset sequence is the tooth which is aligned with the mechanical stop in the opposite direction to the direction of the forces induced in the sequence, excited so as to attract the south pole 23 of the rotor 1. Thus, at no point is there a force acting on the rotor 1 in a direction away from the mechanical stop and, therefore, there will be no movement away from the mechanical stop. In addition, the last steps of winding excitation are such that a rotational force in the rotor 1 in the direction of the mechanical stop, is caused. Therefore, if the power to the motor is removed at this stage the rotor 1 will not attempt to move away from the mechanical stop, as the tooth or teeth with the largest amount of residual flux will attract the respective pole of the rotor 1 towards the mechanical stop. The rotor 1 will therefore continue to be held against the mechanical stop.

Although the example given above is carried out in 'half step mode' (a mode of operation commonly known in the art) it is envisaged that the same sequence may be adapted accordingly so that the reset sequence can be made in micro-stepping mode (a mode of operation commonly known in the art), or any other step subdivision. It will be appreciated that the more step subdivisions that are used the larger the required memory will need to be to store a full start-up or reset sequence.

Figure 6:
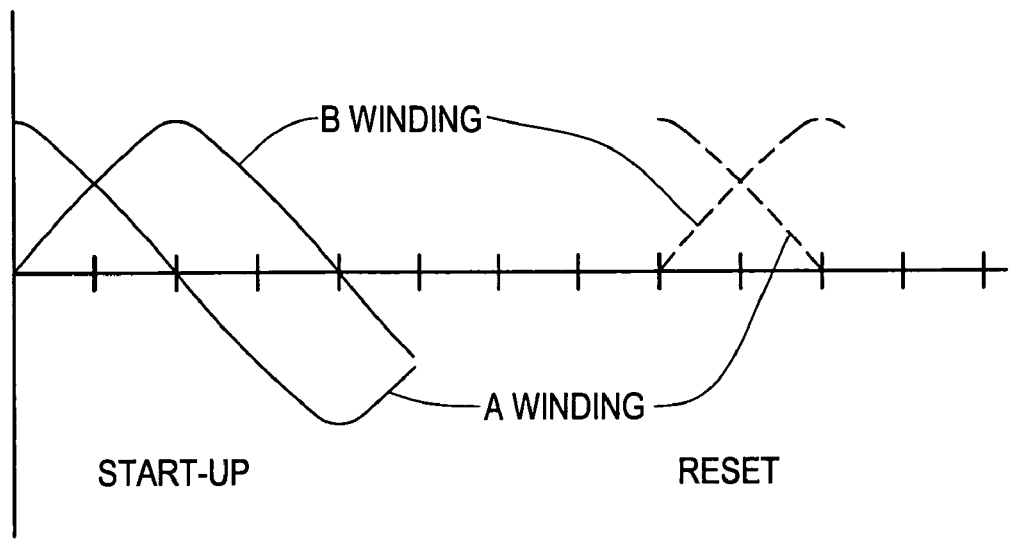
FIG. 6 shows a graph depicting the start-up and reset sequences for use in a method embodying the present invention in micro step mode.

FIG. 6 shows a graph which depicts the start-up and reset sequence utilising a micro-step method. The vertical axis of the graph shows voltages which are applied to the two windings (A) and (B) of the stepping motor. The horizontal axis of the graph shows time, starting when the first voltage signal is applied one of the windings. The initial portion of the two voltage signals represents the start-up sequence. The second portion of the two voltage signals, which is separated from the first portion by a period of time in which no substantial voltage is applied to either winding, represents the voltages applied to the two windings during one reset sequence.

In summary, the present invention provides a control scheme for resetting a stepping motor to minimise vibration during resetting and to reduce pointer movement when the power is removed from the stepping motor.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A method of controlling a stepping motor comprising the step of:
    magnetising at least one of a number of teeth within the stepping motor to move a rotor of the stepping motor into a position such that it contacts or maintains contact with a mechanical stop, wherein a first tooth is generally aligned with the mechanical stop and at least one of the teeth is magnetised such that a rotational force acts to urge the rotor in only a direction towards the mechanical stop, thereby resetting the position of the rotor; and
    providing n teeth in the stepping motor, wherein n is an even number and the n teeth are arranged in two sets such that a first tooth of a first set is offset by an angle from a first tooth of a second set.

2. A method according to claim 1, wherein the mechanical stop is at a known position.

3. A method according to claim 1, further comprising a start-up step in which a number of the teeth are magnetised to provide the rotor of the motor with momentum.

4. A method according to claim 1, wherein when magnetised teeth of the first set have alternating polarities, and teeth of the second set have alternating polarities.

5. A method according to claim 4, wherein the stepping motor is controlled in half-step mode and the method further comprises a start-up step in which a number of the windings are excited to provide the rotor of the motor with momentum.

6. A method according to claim 5, wherein the start-up step comprises the following steps carried out in sequential order:
    magnetising the first tooth of the first set of teeth, the first tooth being generally aligned with the mechanical stop, to form the first pole and magnetising a second tooth of the first set of teeth to form the second pole;
    magnetising a first tooth of the second set of teeth, positioned to one side of the first tooth of the first set of teeth, to form a third pole of the same polarity of as the first pole and magnetising a second tooth of the second set of teeth, positioned between the first and second teeth of the first set of teeth and on the opposing side of the first tooth of the first set of teeth to that of the first tooth of the second set of teeth, to form the fourth pole;
    ceasing to magnetise the first and second teeth of the first set of teeth;
    magnetising the first tooth of the first set of teeth to form the first pole with a polarity opposite to that of the third pole and magnetising the second tooth of the first set of teeth to form the second pole;
    ceasing to magnetise the first and second teeth of the second set of teeth; and
    magnetising the first tooth of the second set to form the third pole with polarity opposite to that of the second pole and magnetising the second tooth of the second set to form the fourth pole.

7. A method according to claim 6, wherein the start-up step further comprises the following sequential steps:
    ceasing to magnetise the first and second teeth of the first set of teeth; and
    magnetising the first tooth of the first set of teeth to form the first pole with polarity opposite to that of the third pole and magnetising the second tooth of the first set of teeth to form the second pole.

8. A method according to claim 5, wherein the resetting step comprises the following sequential steps:
    magnetising the first tooth of the first set of teeth to form the first pole and magnetising a second tooth of the first set of teeth to form a second pole;
    magnetising the first tooth of the second set of teeth, positioned to one side of the first tooth of the first set of teeth, to form the third pole with a polarity opposite to that of the second pole and magnetising a second tooth of the second set of teeth, positioned between the first and second teeth of the first set of teeth and on the opposing side of the first tooth of the first set of teeth to that of the first tooth of the second set of teeth, to form the fourth pole; and
    ceasing to magnetise the first and second teeth of the first set of teeth.

9. A method according to claim 8, wherein the first sequential step is repeated a number of times.

10. A method according to claim 9, wherein the first sequential step is repeated twice.

11. A method according to claim 1, wherein the stepping motor is controlled in full step mode.

12. A method according to claim 1, wherein the stepping motor is controlled in micro-step mode.

13. A method according to any one of claim 1, wherein the motor is controlled in half step mode.

14. A method according to claim 1, wherein there are two or more poles on a rotor of the stepping motor.

15. A method according to claim 1, wherein the teeth of the stator are magnetised by using current carrying coils or windings in the motor.

16. A method according to claim 1, wherein the stepping motor is attached to one or more gears.

17. A method according to claim 1, wherein if a first tooth of a first set of teeth is magnetised all of a first sub-set of the first set of teeth are magnetized in a corresponding manner to the first tooth of the first set of teeth, if a second tooth of a first set of teeth is magnetised all of a second sub-set of the first set of teeth are magnetised in a corresponding manner to the second tooth of the first set of teeth, if a first tooth of a second set of teeth is magnetised all of a first sub-set of the second set of teeth are magnetised in a corresponding manner to the first tooth of the second set of teeth, and if a second tooth of a second set of teeth is magnetised all of a second sub-set of the second set of teeth are magnetised in a corresponding manner to the second tooth of the second set of teeth.

* * * * *

UNITED STATES PATENT AND TRADEMARK OFFICE
CERTIFICATE OF CORRECTION

PATENT NO. : 7,701,163 B2 Page 1 of 1
APPLICATION NO. : 11/387187
DATED : April 20, 2010
INVENTOR(S) : Gordon Harry Eric Sadler It is certified that error appears in the above-identified patent and that said Letters Patent is hereby corrected as shown below:

In Claim 13, Column 12, Line 41 of the patent, "A method according to any one of claim 1, wherein the motor is controlled in half step mode." should read --A method according to claim 1, wherein the motor is controlled in half step mode--.

Signed and Sealed this

Fifteenth Day of June, 2010

David J. Kappos
*Director of the United States Patent and Trademark Office*